(No Model.) 7 Sheets—Sheet 3.

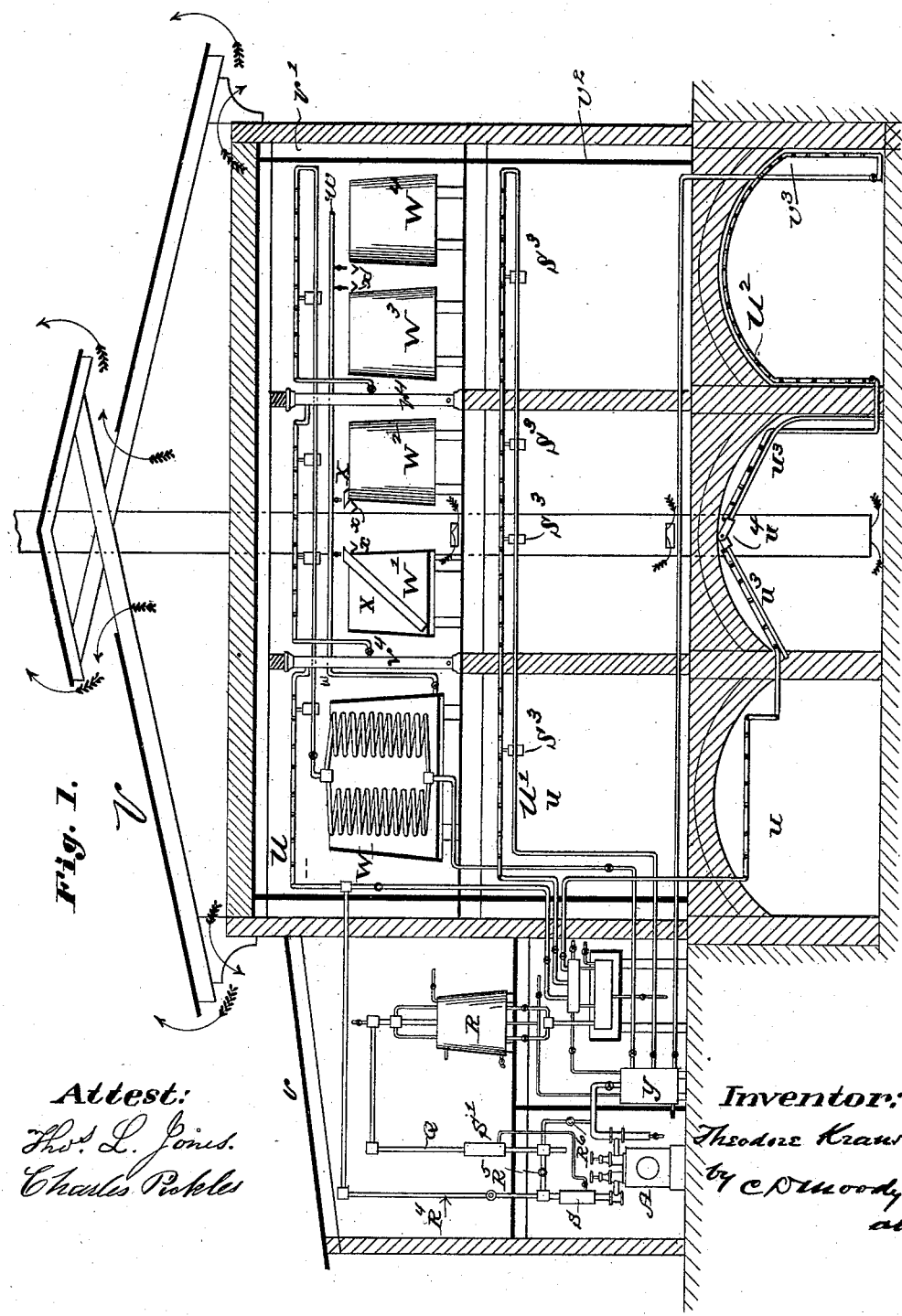

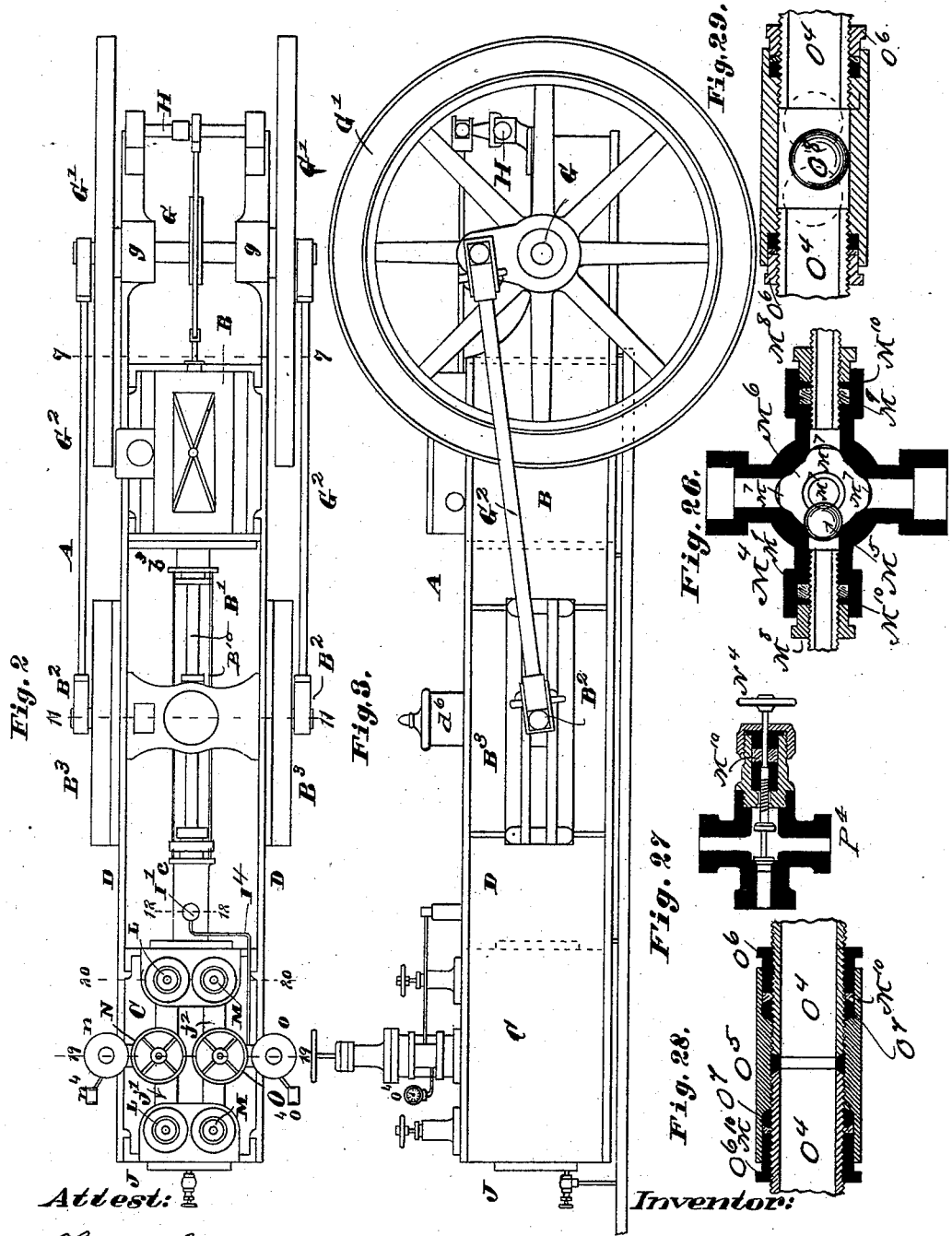

T. KRAUSCH.
REFRIGERATING APPARATUS.

No. 316,900. Patented Apr. 28, 1885.

Attest:
Fred K. Gear
W. J. Kesl

Inventor:
Theodore Krausch
by C. D. Moody atty (No Model.) 7 Sheets—Sheet 4.
T. KRAUSCH.
REFRIGERATING APPARATUS.
No. 316,900. Patented Apr. 28, 1885.
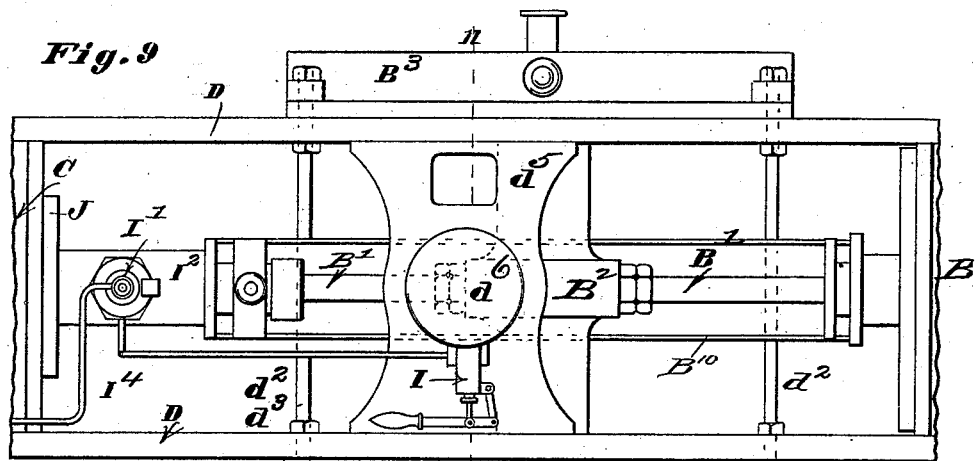
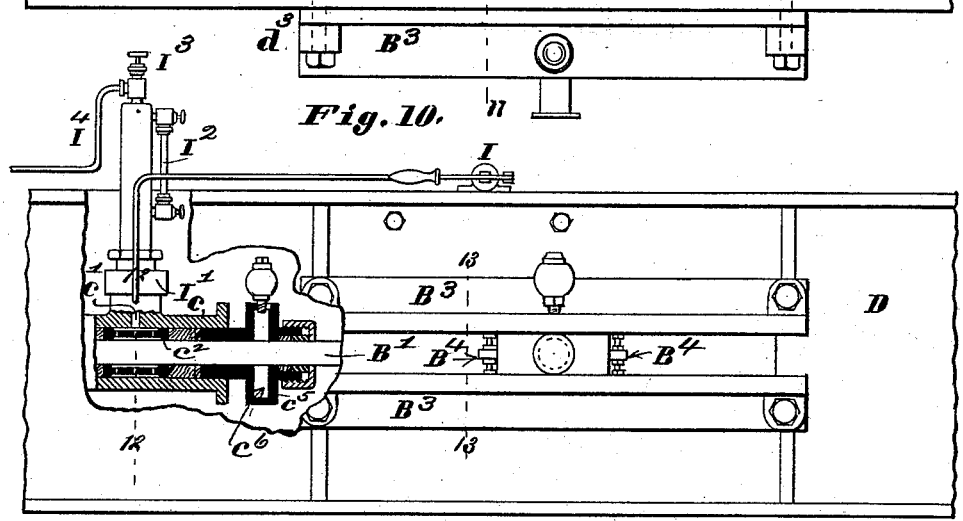
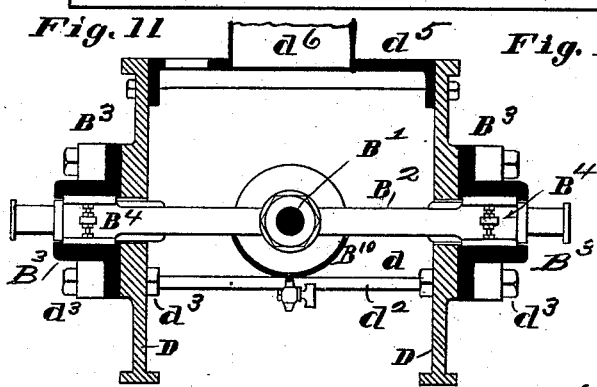
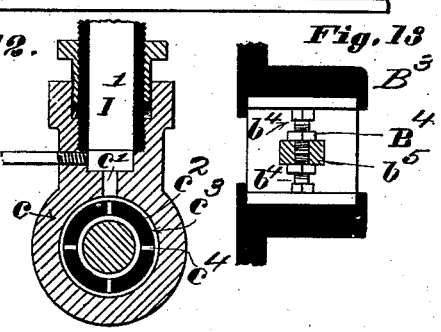
Attest:
Fred K Sear
W. J. Kiel
Inventor:
Theodore Krausch
by C. D. Moody
atty (No Model.) 7 Sheets—Sheet 5.
T. KRAUSCH.
REFRIGERATING APPARATUS.
No. 316,900. Patented Apr. 28, 1885.
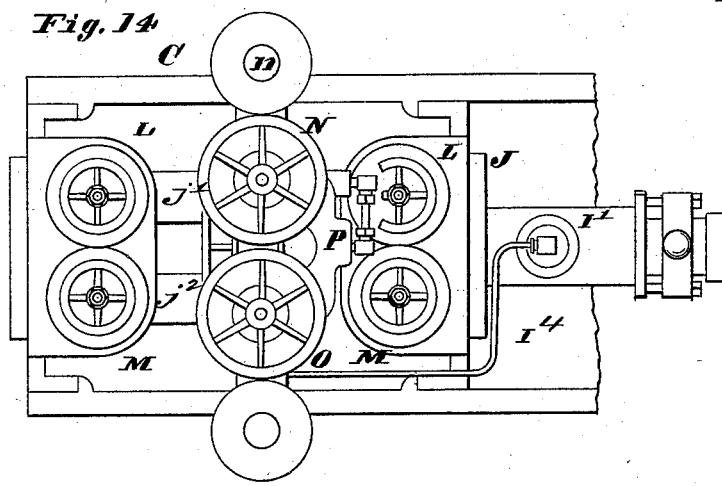
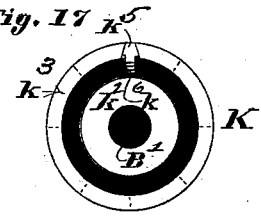
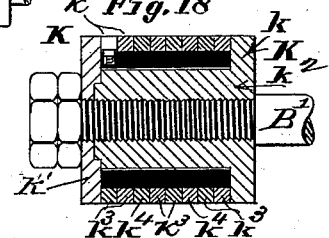
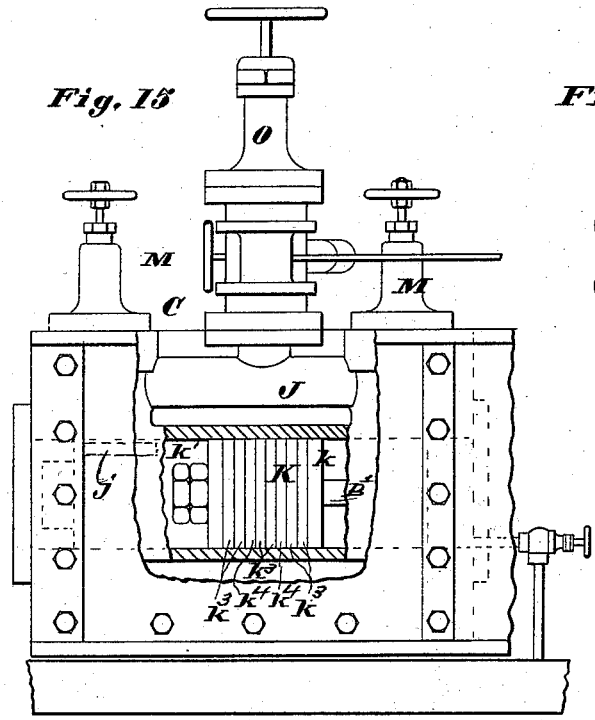
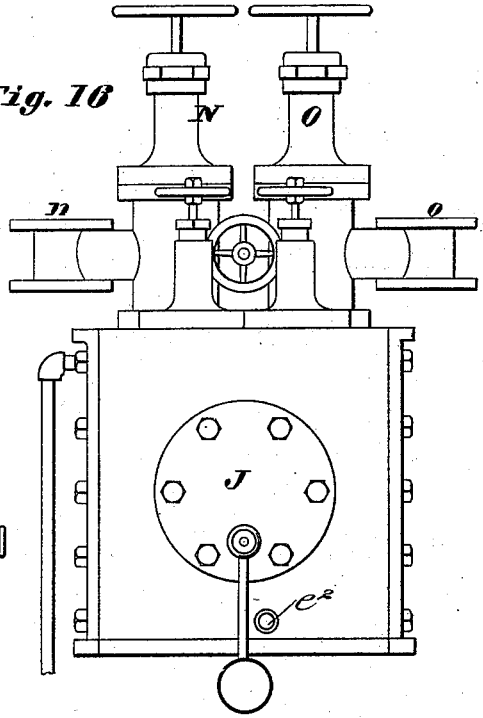
Attest:
Fred Lear
W. J. Kesl
Inventor:
Theodore Krausch
by C. D. Moody
atty

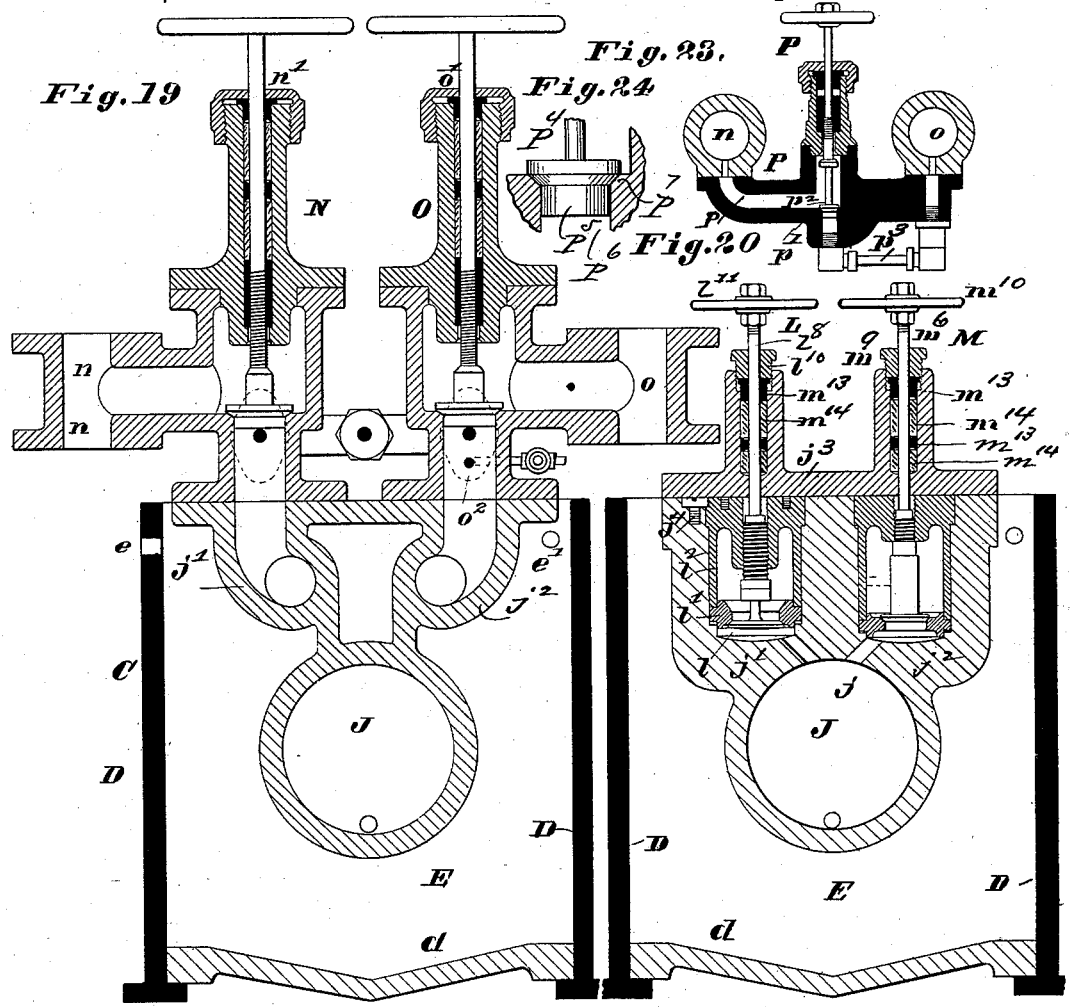
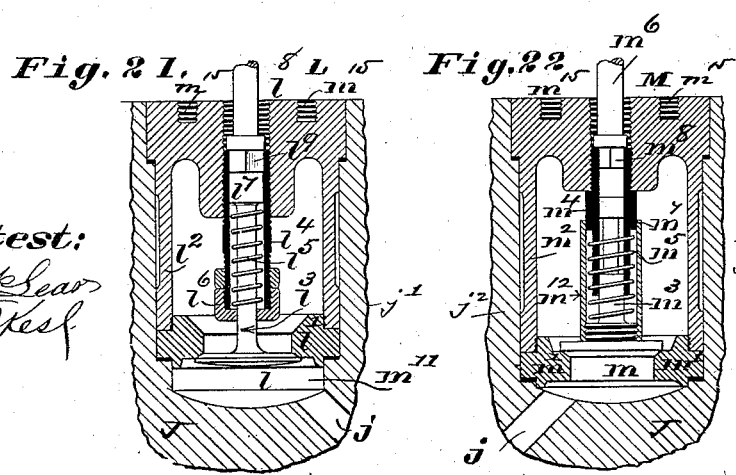

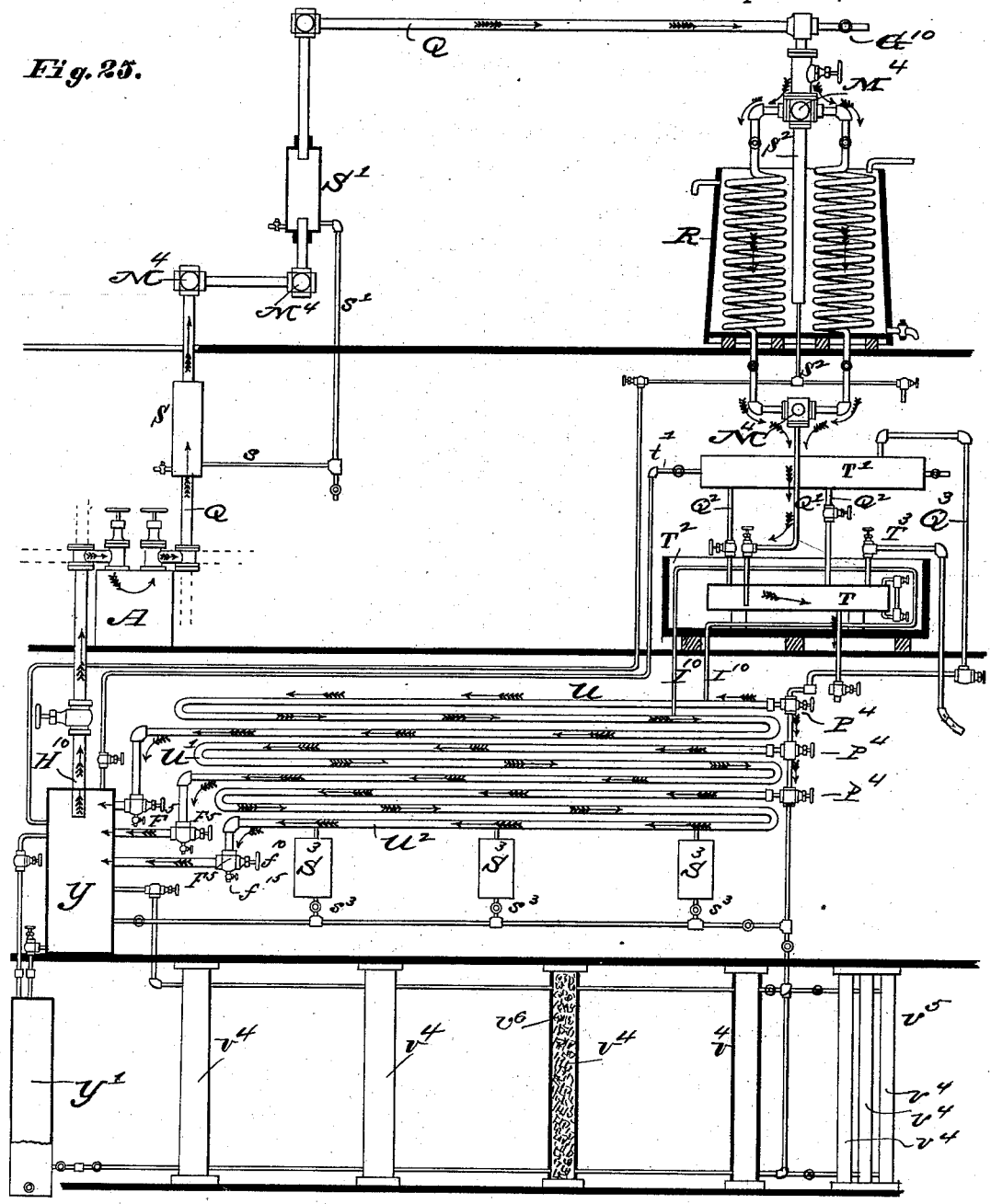

UNITED STATES PATENT OFFICE.

THEODORE KRAUSCH, OF ST. LOUIS, MISSOURI.

REFRIGERATING APPARATUS.

SPECIFICATION forming part of Letters Patent No. 316,900, dated April 28, 1885.

Application filed August 26, 1882. (No model.)

*To all whom it may concern:*

Be it known that I, THEODORE KRAUSCH, of St. Louis, Missouri, have made a new and useful Improvement in Refrigerating Apparatuses, of which the following is a full, clear, and exact description, reference being had to the annexed drawings, making part of this specification, in which—

Figure 4:
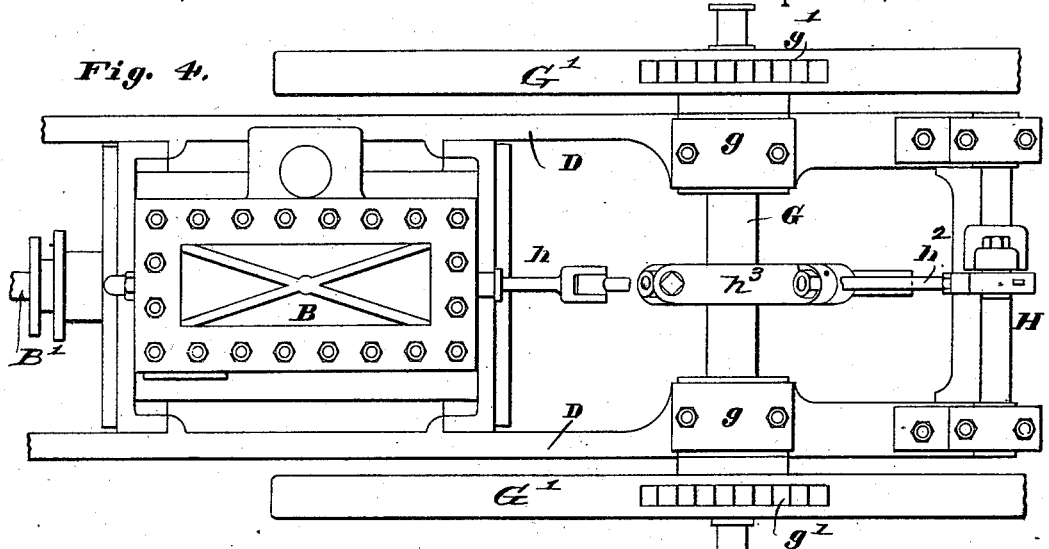
Figure 5:
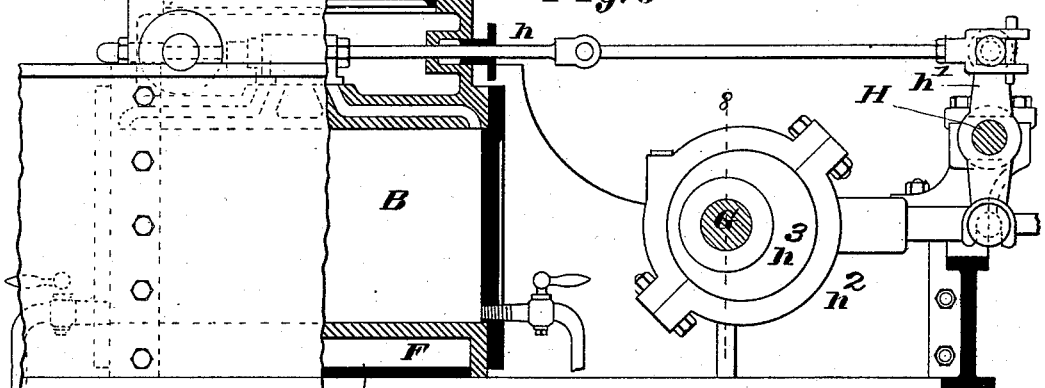
Figure 6:
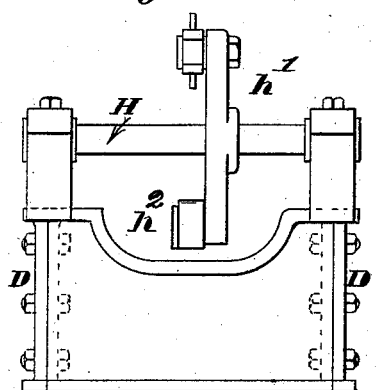
Figure 8:
Figure 7:
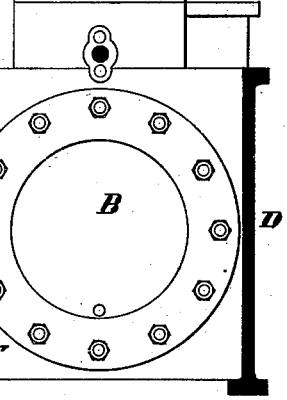

Figure 1 is a vertical section taken through a building having the improvement; Fig. 2, a plan of the pump; Fig. 3, a side elevation of the pump; Fig. 4, a plan of the steam-cylinder and parts immediately therewith connected; Fig. 5, a side elevation, partly in section, of the parts shown in Fig. 4; Fig. 6, a view of the forward end of the pump-frame; Fig. 7, a vertical section taken on the line 7 7 of Fig. 2; Fig. 8, a sectional detail taken on the line 8 8 of Fig. 5; Fig. 9, a plan of the cross-head and adjacent parts; Fig. 10, a side elevation, partly in section, of the parts of Fig. 9; Fig. 11, a vertical cross-section taken on the line 11 11 of Figs. 9 and 2; Fig. 12, a section enlarged taken on the line 12 12 of Fig. 2; Fig. 13, a sectional detail taken on the line 13 13 of Fig. 10; Fig. 14, a plan of the compressor; Fig. 15, a side elevation, partly in section, of the parts of Fig. 14; Fig. 16, an end elevation of the compressor; Fig. 17, a cross-section of the compressor-piston; Fig. 18, a longitudinal section of the compressor-piston; Fig. 19, a vertical cross-section taken on the line 19 19 of Fig. 2; Fig. 20, a vertical cross-section taken on the line 20 20 of Fig. 2; Fig. 21, a vertical section, enlarged, taken through one of the supply or suction valves of the compressor; Fig. 22, a vertical section, enlarged, taken through one of the discharge or force valves of the compressor; Fig. 23, a horizontal section taken through the equalizer; Fig. 24, a view of one of the feed-valves, showing the valve-seat in section; Fig. 25, an elevation of the refrigerating apparatus as applied to a building having several stories, the relative arrangement of the various parts of the apparatus being a modification of that shown in Fig. 1; Fig. 26, a section of one of the distributing-unions; Fig. 27, a section of one of the feed-cocks; Fig. 28, a longitudinal section of one of the pipe-couplings; and Fig. 29, a longitudinal section of one of the couplings, showing valve.

The same letters denote the same parts.

The present invention is applicable to breweries, malt-cellars, beer-caves, wine-vaults, vessels, cars, buildings, including hospitals, storage-houses, cellars, and saloons, to meat curing, packing, and preserving establishments, and to other structures and places where refrigeration is desired.

The improvement relates to various features immediately associated with and forming part of the pump; to the frame-work of the pump; to the mode of jacketing the steam-cylinder and cooling the compressor; to the valve-gear of the engine; to the cam and strap of the valve-gear; to the construction of the fly-wheel rims; to the adjustment of the cross-head; to the mechanism for lubricating the compressor-rod and the parts immediately associated with such mechanism; to the compressor-piston; to the valves of the compressor; to the means for equalizing the pressure in the force and suction sides of the compressor; to the construction of the feed-valves; to various features of the system of pipes, valves, and chambers used in the circulation of the ammonia or other cooling agent; to the means for more effectually condensing the ammonia, and various details therewith connected; to the means for directing and controlling the circulation of the cooling agent in the various coils of the circulatory system; to the construction of the cooling-surfaces; to the means for draining and cleaning the cooling-coils, &c.; to the means for returning the gas to the compressor; to the mode of coupling the pipes used in the coils and elsewhere, and to other minor details.

The construction used in carrying out the improvement, generally considered, consists of a pumping apparatus for effecting the circulation of the cooling agent and the system of pipes, valves, and chambers wherein the cooling agent is caused to circulate.

A, Figs. 1, 2, 3, represents the pump, the view being upon a reduced scale, and showing only the main features of the pump, and in outline. B represents the steam-cylinder of the pump, and C the compressor. The cylinder-piston and the compressor-piston are attached to the same rod, B'.

D D represent side plates. They serve to tie the cylinder and compressor together directly in the line of the strain, which tends to separate and bring together these parts in using them, and they constitute the frame of the pump. They also serve at one end and in connection with the bottom plate, $d$, to inclose a chamber, E, Figs. 19, 20, which extends upward sufficiently to take in both the compressor-cylinder and the compressor, force, and suction valves, and opposite the steam-cylinder, and in connection with the removable plate $d'$, to similarly inclose a chamber, F, Fig. 5, around the bottom and sides of the cylinder B. The plates between the cylinder and compressor support the guides $B^3$ $B^3$ for the cross-head $B^2$, which is attached to the rod $B'$. Beyond the cylinder B the plates are extended to provide bearings $g$ $g$ for the fly-wheel shaft G, Figs. 2, 4, 5, and the rock-shaft H. Fly-wheels $G'$ $G'$ are upon the shaft G, and pitmen $G^2$ $G^2$ connect the cross-head $B^2$ and the fly-wheels. The cylinder-valve rod $h$ connects with the rock-arm $h'$ upon the shaft H at the upper end of the arm, and the lower end of the arm $h'$ is, by means of the strap $h^2$, connected with a cam, $h^3$, upon the shaft G. The motion of the cross-head thus effects the operation of the cylinder-valve. The chamber F is filled with a suitable substance—such as mineral wool—for jacketing the cylinder. The plate $d'$ is removable to enable the lower part of the chamber F to be readily reached. The strap $h^2$ and the cam $h^3$ are relatively shaped as shown in Fig. 8, the strap being wider than the cam and cup-shaped, to catch and hold the oil dripping from the cam and upper part of the strap. The fly-wheels $G'$ are furnished with ratchets $g'$ $g'$, by means of which the wheels can be turned, a bar being inserted in the ratchet and pried over any suitable bearing. The cross-head $B^2$ is adjusted to and properly held in the guides $B^3$ by means of the devices $B^4$ $B^4$, Figs. 10, 11, 13, the devices consisting of the screws $b^4$ $b^4$, working in opposite directions in the nut $b^5$. The plates D D are stayed below by means of the bolts $d^2$ and nuts $d^3$ $d^3$, Figs. 9, 11, and above by means of the plate $d^5$. The last-named part supports a reservoir, $d^6$, for holding oil for lubricating. It also serves to hold a pump, I, by means of which the oil can be taken from the reservoir $d^6$ and forced into the chamber $I'$, Figs. 9, 10, 12. The chamber $I'$ is mounted upon the stuffing-box $c$ of the compressor. The oil is forced into the chamber $I'$, and flows thence through the passage $c'$ into the stuffing-box. A sleeve, $c^2$, Fig. 12, surrounds the piston-rod, and the oil is supplied to the rod through the various passages $c^3$ $c^4$ in the sleeve. The height of the oil in the chamber $I'$ can be determined by the gage $I^2$. This gage contains automatic valves. The chamber $I'$ is closed at the top, saving when opened by the valve or cock $I^3$, the object of which is as follows: In case the ammonia escapes from the compressor-cylinder into the stuffing-box $c$, it passes above the oil in the chamber $I'$ and gage $I^2$, where it can be seen and the quantity thereof determined. Then, by opening the valve $I^3$, the ammonia can pass from the chamber $I'$ into a pipe, $I^4$, which communicates with the compressor-cylinder on the suction side thereof, and, in consequence, the ammonia is drawn from the chamber $I'$ into the compressor-cylinder again, and thereby recovered.

J, Figs. 2, 3, 14, 15, 16, 19, 20, represents the compressor-cylinder, wherein the ammonia from the cooling-coils is received, and thence returned to the coils. In diameter it is much smaller than the steam-cylinder, the relative proportions in practice being about as one to three. It is furnished with a peculiarly-constructed piston, and with a pair of suction or supply valves, a pair of force or delivery valves, and a pair of what may be termed "throttle-valves." A device, P, for equalizing the pressure in the two side pipes of the cylinder is also shown. K, Figs. 15, 17, 18, represents the compressor-piston. It is shown in side elevation in Fig. 15, and in section in Figs. 17 and 18. It is made unusually long, its length being equal to half the length of the piston-stroke, and it is composed, mainly, of the disks $k$ $k'$, the sleeve $k^2$, and the two sets of rings $k^3$ and $k^4$, one set being what are termed "guide-rings" and the other set "packing-rings," and more particularly described as follows: At both ends of the piston are a pair of the packing-rings $k^3$ $k^3$; then comes a guide-ring, $k^4$, and then between the guide-rings is another pair of the packings. In the drawings eight rings are thus associated. This number, however, is not always essential, as in pistons of different sizes the total number of rings may be different. The principle here shown of combining packing and guide rings is carried out, however, whether more or less rings are used. The packing-rings are expansile, the rings being divided, as shown in Figs. 17, 18, and being set out against the cylinder-shell by means of the wedges $k^5$, which in turn are actuated by the springs $k^6$, the latter at their inner ends bearing against the sleeve $k^2$, and at their outer ends against the shoulders of the wedge. The guide-rings $k^4$ are made to accurately fit the space between the sleeve $k^2$ and the cylinder-shell, being continuous rings, extending without break around the sleeve $k^2$, and fitting closely thereto, and externally coming as snugly against the cylinder shell as is practicable and consistent with the movement of the piston. The rings in each pair of the packing-rings $k^3$ $k^3$ are relatively arranged to break joints. The aim and effect of this combination of the rings $k^3$ $k^4$ and the sleeve $k^2$ is to effectually prevent the escape of the ammonia under high pressure past the piston. By extending the piston longitudinally, as described, the ports $j$, Figs. 15, 20, 21, 22, can, to obtain the needed size of opening, be extended longitudinally, as shown, instead of transversely in the cylinder. This in turn enables the ports to be arranged very near the top of the cylinder, and thereby in turn enables the space between the entrance to the port and the valve to be reduced greatly, as seen in Fig. 20. For in working ammonia it is desirable to confine to a minimum the spaces in which the ammonia is left to expand again on the withdrawal of the piston. The compressor is double-acting, having two suction-valves, L L, in the side pipe $j'$, and two force-valves, M M, in the side pipe $j^2$. The suction-valves are shown more in detail in Figs. 20, 21. The valve proper, $l$, seats upward against the seat $l'$. The latter is held down in place in the side pipe by means of the inverted cup $l^2$, and the latter in turn by the top plate, $j^3$, of the cylinder, or by the screws $j^4$. The valve-stem $l^3$ slides upward and downward in a guide-tube, $l^4$, which in turn is held and is capable of vertical adjustment in the cup $l^2$, the tube being threaded to engage in the cup. A spring, $l^5$, pressing at its lower end upon a cap, $l^6$, at the bottom of the tube, and at its upper end against a shoulder or head, $l^7$, on the valve-stem, serves to lift the valve $l$ against its seat $l'$. A stem, $l^8$, squared at $l^9$, to enable it to turn the tube $l^4$ in the cup $l^2$, engages in the tube, and extends upward therefrom to above the stuffing-box $l^{10}$. By suitably turning the handle $l^{11}$ of the stem $l^8$ the tube $l^4$ can be vertically adjusted in the cup $l^2$, and the spring $l^5$ thereby made to lift the valve $l$ more or less promptly, as desired.

The force-valves are shown more in detail in Figs. 20, 22. The valve proper, $m$, seats downward upon the seat $m'$. The latter is held down in place by means of the inverted cup $m^2$, and the cup in turn is held down by means similar to that shown in connection with the cup $l^2$. The valve-stem $m^3$ slides up and down in the tube $m^4$. This tube is held and is capable of vertical adjustment in the cup $m^2$. A spring, $m^5$, pressing at its lower end upon the valve and at its upper end against a shoulder, $m^7$, on the tube $m^4$, serves to depress the valve $m$ against its seat $m'$. A stem, $m^6$, squared at $m^8$, to enable it to turn the tube $m^4$ in the cup $m^2$, engages in the tube, and extends upward therefrom to above the stuffing-box $m^9$, and at its upper end is provided with a handle, $m^{10}$. By suitably turning the handle and stem the tube $m^4$ can be vertically adjusted in the cup $m^2$, and the spring $m^5$ thereby made to bear as desired upon the valve $m$. There are removable gratings $m^{11}$ below the valves $l$ $m$, to prevent any of the parts from dropping accidentally into the ports. The tube $m^{12}$ serves to inclose the spring $m^5$ in the event of the latter breaking. The stuffing-boxes $l^{10}$ $m^9$ contain the rings $m^{13}$, as well as the ordinary packing, $m^{14}$. In this way either valve $l$ or $m$ can be adjusted during the working of the pump without having to remove any of the parts. By removing the plate $j^3$ and screws $j^4$ the valves and parts therewith immediately connected can be lifted out of the side pipes. For this purpose the cups have threaded sockets $m^{15}$, Figs. 21, 22, to receive a suitable lifting device.

N represents the throttle suction-valve, by means of which the gas is admitted into the compressor; and O, the throttle force-valve for discharging the contents of the compressor, the inlet being at $n$, and the outlet at $o$. The valve-stems $n'$ $o'$ are packed similarly to the stems $l^8$ $m^6$. It will be seen that the two throttle-valves are side by side. This enables the two valves to be reached and operated at the same time, the operator with one hand turning one valve, and with the other hand the other valve. Gages $n^4$ $o^4$, Figs. 2, 3, are attached to the inlet and outlet pipes, respectively, to enable the operator to determine the pressures in the two sides.

It is frequently, as in starting, very desirable to equalize the pressures in the supply and the delivery sides of the compressor. To this end I employ the device P, (shown in Figs. 14, 23,) consisting as follows: A pipe, $p$, leads from the inlet $n$ to the outlet $o$. In the pipe is a valve-seat, $p'$, and by means of the valve $p^2$, which seats at $p'$, the pipe $p$ can be opened and closed as desired, and communication between the passages $n$ and $o$ be established or closed accordingly. When the pipe is opened, the pressure is equalized in the passages $n$ $o$.

To enable the movement of the ammonia through the pipe to be observed, a glass, $p^3$, is introduced and made part of the pipe. This device P also serves to introduce the warmer compressed gas from the eduction-passage $o$ into the inlet $n$, thence into the compressor-cylinder, and to raise the temperature of the returning gas whenever it becomes sufficiently cold to form ice in said cylinder and thereby injure the compressor.

The basin E, Figs. 19, 20, extends, it is seen, high enough to submerge all that part of the construction in which the force and suction valve mechanisms are contained. A current of water flows through the basin, entering, say, at $e$, and flowing out, say, at $e'$, serving to keep down the temperature in the compressor-cylinder. By means of the cock $e^2$ the contents of the chamber E can be drawn off. There is at $o^2$, Fig. 19, an outlet to the open air, to provide for discharging the gas from the compressor-cylinder when the feed valves N O are closed. This outlet may be closed by a suitable cock, and it should be so closed when the contents of the cylinder are passing to the coils.

The mechanism employed more immediately in the circulation of the cooling agent will now be described. The parts in question are shown in Figs. 1, 25.

From the pump A a pipe, Q, leads to the condenser R. It is exceedingly important in compressing and expanding such agents as ammonia (the agent generally used in refrigerating systems like the present, and the agent preferably here used) in a refrigerating apparatus such as here shown to have the agent as free as possible from impurities. The smallest particles of foreign matter are sufficient often to prevent the proper working of the apparatus. To this end, at various points in the present circulatory system, what may be termed "settling" and "equalizing chambers" are introduced, wherein the impurities in question are arrested and collected and thereby eliminated from the ammonia. The first of these settling-chambers are introduced between the pump and the condenser. They are shown at S S', Figs. 1, 25. The chambers are virtually enlargements transversely in the pipe Q, and their effect is to check the rate at which the spreads move—that is, the gaseous current on reaching the settling-chamber expands and, in consequence of the spreading, moves less rapidly through the chamber than it has been moving through the pipe Q. This checking of the rate of the current causes the impurities to settle and collect in the chamber S, from which they can be removed in any suitable manner, as by the drain-pipe $s$. The operation of this chamber is also analogous to that of the air-chamber of an air-pump. It causes the current to move at a more uniform rate. The settling and equalizing operation is repeated in the chamber S', and the impurities collecting there are withdrawn through the pipe $s'$. Another settling and equalizing chamber, $S^2$, Fig. 25, is employed in the immediate vicinity of the condenser R to further sift out the impurities occurring at that point. A drain-pipe, $s^2$, is used to withdraw the impurities from the chamber $S^2$. The liquid ammonia is conducted through the pipe or pipes Q' to the main receiving-chamber T. It passes thence through the pipe or pipes $Q^2$ to an auxiliary receiving-chamber, T'. This last-named chamber serves to hold any excess of ammonia that cannot be received in the chamber T, it being sometimes desirable to pump all of the ammonia out of the condenser to enable the condenser to be reached for repair. The chamber T' also operates as another settling-chamber. The settlings may be withdrawn therefrom through a suitable drain-pipe, such as $t'$. The ammonia passes from the chamber T', through the pipe or pipes $Q^3$, to the various cooling-coils U U' $U^2$, &c.

It is not necessary that the machine be idle while the condenser is being repaired. By disconnecting the latter and establishing a simple pipe connection between the receiver and compressor the apparatus can be effectually operated without the condenser, the surplus ammonia from the condenser being accommodated by the auxiliary receiver T'.

These coils are located variously to suit the location and shape of the rooms and places being cooled. In Fig. 25 the condenser is shown arranged in an upper story of the building, and the cooling-coils are in a lower story. In Fig. 1 the pump, condenser, &c., are arranged in an annex, $v$, to the main building V, and the coils U U', &c., are respectively in the different stories $v'$ $v^2$ $v^3$ of the building. The coils are also at various intervals furnished with settling and chilling chambers $S^3$, and for the same purpose and operated in the same way as the settling-chambers above named. The coil U, after passing through the room $v'$, is used to cool water in a tank, W, Fig. 1. The cooled water flows from the tank through the pipe $w$. This pipe is carried upward and over tanks W', &c. This is to enable the cold water to be discharged as desired, and by means of suitable cocks, into vessels X. The water falls into the vessels, and then wells upward and out from the vessels, and is caught in troughs $x$ $x$. A flow of cold water is thus maintained through the vessels. The vessels are preferably portable. They are used for cooling the beer vats or tanks W' $W^2$, &c., the vessels being dropped into the tanks, as shown. The story $v'$ also illustrates another feature of the improvement. The posts or columns $v^4$ of the building may be made hollow, as seen in Fig. 25, and made part of the system used in circulating the cooling agent. To this end the pipes of the coil or coils are connected with the columns, causing the ammonia to flow through the columns and thence back into the coils again, as seen in Fig. 1, or to the pump or accumulator, as in Fig. 25. In connection with the coil $U^2$, Fig. 1, is illustrated a mode of connecting the various parts of the coils, so that they can be adapted to ceilings of different shapes. The two parts $u^3$ $u^3$ of the coil are hinged together at $u^4$. This enables the parts to be inclined at different angles to each other. The various coils finally lead to the accumulator Y, where the various gaseous currents are assembled, and from whence they are drawn to the pump A.

In Figs. 26, 27, 28, 29 are shown various couplings used in connection with the coils and elsewhere in the present apparatus. $M^4$, Fig. 26, represents a cross for uniting pipes extending in several directions. A ball-valve, $M^5$, is contained in the central chamber, $M^6$, of the cross. The valve can seat at any one of the seats $M^7$ of the cross. In case of accident, and there is a rush of the ammonia into any one of the pipes connecting with the cross, the valve is drawn against the seat $M^7$, leading into the pipe in question, and the flow of the ammonia thereby checked. The glands $M^8$, preferably, do not bear directly against the packing $M^9$, but against an interposed ring, $M^{10}$. A similar ring $M^{10}$ is used in packing the stem $N^4$ in the feed-cock shown in Fig. 27.

Fig. 28 shows the mode of coupling pipes. The pipes $O^4$ $O^4$ are screwed into a wrought-iron thimble, $O^5$. Glands $O^6$ $O^6$ are then screwed upon the pipes inside the thimble. The glands do not preferably bear directly against the packing $O^7$ $O^7$, but against the interposed rings $M^{10}$ $M^{10}$.

Fig. 29 shows a coupling similar to that of Fig. 28, saving that the pipes $O^4$ $O^4$ are spaced apart sufficiently to admit a ball-valve, $O^8$, which operates similarly to the valve $M^5$ in the cross $M^4$.

Fig. 24 shows a form of valve which is used in various places of the present apparatus in feeding the ammonia. The valve $P^4$ has an extension, P⁵, which fits snugly into the passage P⁶ below or beyond the seat P⁷. The object of the device is to feed the ammonia in small quantities, the operation being as follows: The valve is lifted from the seat P⁷, but not far enough to withdraw the extension P⁵ from the passage P⁶. The ammonia then leaks past the extension P⁵, and, in consequence, is fed in the small quantity desired. The extension is also useful in seating the valves. The tank T², Figs. 1, 25, is used to inclose the chamber T, the tank being filled with cold water for the purpose of cooling the receiving-chamber.

Every coil U U', &c., can be emptied independently of the other coils. To this end a double valve, E⁵, Fig. 25, is used. One part, $f^{10}$, of the valve is used to cut off the passage from the coil U to the accumulator Y, and the other part, $f^{15}$, of the valve is opened to allow the contents to be drawn off through a suitable drain-pipe. In draining any one of the coils the supply thereto is shut off. The air whenever it collects therein is drawn off above the condenser by means of the valve G¹⁰, Fig. 25.

The pipe H¹⁰, leading from the accumulator Y, Fig. 25, to the pump, is extended into the accumulator below the top thereof, substantially as shown. The aim and effect of this extension is to prevent any dirt which may collect in the accumulator from being drawn into the pump A.

Y' is a receiver below the accumulator Y, Fig. 25, and connected therewith, but so as to be detached therefrom when desired. Impurities are collected in the receiver Y', and from time to time it is disconnected from the coils and the accumulator and taken away to be emptied. The hollow posts $v^4$ are also settling-chambers. The ammonia, as seen in Fig. 25, can be fed thereto either at the top or at the bottom thereof. Several of the hollow posts $v^4$ can be associated in a cluster, $v^5$, Fig. 25, and thus both strengthen the structure and increase the cooling-surface. A pipe, I¹⁰, Fig. 25, runs from the coil U through the tank T², for the purpose of cooling the water therein.

It is sometimes desirable to exhaust the condenser R, Figs. 25, 1. To this end any pipe, such as R⁴, Fig. 1, leading from the pump directly to the coils is opened, the valve R⁵ in the pipe leading from the pump to the condenser is closed, the valve R⁶ in the pipe leading from the condenser to the suction side of the pump is opened, and the pipe leading from the accumulator Y to the pump is preferably closed. The pump then being operated, the condenser is emptied of its contents.

The ammonia may be charged into the coils, &c., through the pipe T³, Fig. 25, leading to the receiver T.

The condenser, the receiver T, and the accumulator Y are preferably assembled in immediate proximity to each other in a part of the building separate from that containing the coils, as seen in Fig. 1. This greatly facilitates the superintending of the circulatory system.

The cooling agent, generally ammonia, as stated, is so penetrating that with ordinary castings a constant loss is experienced by reason of the agent escaping directly through the pores of the castings. To prevent this I coat all the parts of the compressor, and also many other parts of the apparatus exposed to the cooling agent, with another metal, such as tin. The effect is to close the pores of the cast metal against the passage of the cooling agent.

For the purpose of ventilation, and to conduct away any offensive odors which may be occasioned by the leakage of gas from the apparatus, the building V is provided with a ventilating-pipe extending above the roof, and communicating through openings with the various stories, $v'$ $v^2$ $v^3$, near the floors thereof, as shown in Fig. 1.

The columns $v^4$ should be filled with loose material, such as coke, to obviate the need of using an unnecessary amount of the ammonia in the columns.

A drip-basin, B¹⁰, Figs. 2, 9, and 11, is arranged beneath the piston-rod, being upheld in position by attaching it at its ends to the stuffing-boxes $c$ and $b^3$.

I claim—

1. The combination, in a refrigerating apparatus, of the steam-cylinder B, the compressor C, the plates D D, inclosing the chambers E and F, and a non-conductor-of-heat packing about said cylinder B, substantially as and for the purposes set forth.

2. The combination, in a refrigerating apparatus, of a case formed by plates D D, the compressor C, inclosed in said case and surrounded by a cooling medium, and the steam-cylinder B, supported by said plates D in the same axial line with said compressor C, substantially as and for the purposes set forth.

3. The combination, in a refrigerating apparatus, of the deep case or trough formed by plates D D and $d$, the compressor C, and the suction and force valves inclosed in said case or trough and surrounded by a cooling medium, substantially as and for the purposes set forth.

4. The combination, in a refrigerating apparatus, of the supporting-frame formed by plates D D, provided with bearings $g$ $g$, the compressor C, inclosed in a chamber, E, formed by said plates D and the bottom plate, $d$, and the steam-cylinder B, mounted upon or in said frame, substantially as and for the purposes set forth.

5. The combination, in a refrigerating apparatus, of the compressor C, having the cylinder J, the inlet and outlet $n$ $o$, connected therewith, and the supply and delivery feed-valves N O, arranged side by side, substantially as and for the purposes set forth.

6. In a refrigerating apparatus, the combination of the cylinder J, the pipes $j'$ $j^2$, communicating with the ends of said cylinder, and connected, respectively, with the inlet $n$ and the outlet o, and the automatic externally-adjustable suction and force valves L L and M M, substantially as and for the purposes set forth.

7. In a refrigerating apparatus, the combination of the cylinder J, the inlet and outlet n o, each connected by branch pipes $j'$ $j^2$ with opposite ends of said cylinder, a pair of suction and force valves, L M, arranged side by side at each end of said cylinder, and the supply and delivery feed-valves N O, arranged side by side in like manner, substantially as and for the purposes set forth.

8. The combination, in a refrigerating apparatus, of the cylinder J, provided with pipes or passages $j'$ $j^2$, which communicate with each end of said cylinder through ports $j$, an automatic suction-valve, $l$, located at each end of said pipe $j'$, and side by side with an automatic force-valve, $m$, located at each end of said pipe $j^2$, substantially as and for the purposes set forth.

9. The combination, in a refrigerating apparatus, of the cylinder J, provided with a socket, a cage formed by the removable inverted cup $l^2$ and seat $l'$, fitting said socket, the valve-stem $l^3$ and spring $l^5$, inclosed in said cage, and the valve $l$, all removable with said cage, substantially as and for the purposes set forth.

10. The combination, in a refrigerating apparatus, of the cylinder J, provided with a socket for the reception of a cage formed by the removable inverted cup $m^2$ and the seat $m'$, the valve $m$, stem $m^3$, and spring $m^5$, all inclosed in said cage and removable therewith, substantially as and for the purposes set forth.

11. The combination, in a refrigerating apparatus, of cylinder J, an adjustable suction-valve, $l$, and force-valve $m$, cages composed of the removable inverted cups $l^2$ $m^2$ and valve-seats $l'$ $m'$, inserted into sockets formed side by side in said cylinder, and communicating, respectively, with the induction and eduction pipes, cap-plates $j^3$, provided with stuffing-boxes $l^{10}$ $m^9$, and the adjusting-stems $l^8 m^6$, extending through and above said stuffing-boxes, substantially as and for the purposes set forth.

12. The combination, in a refrigerating apparatus, of the valve $l$, provided with stem $l^3$, the seat $l'$, the spring $l^5$, the threaded tube $l^4$, inclosing said spring about said stem $l^3$, and the adjusting-stem $l^8$, engaging with said tube, substantially as and for the purposes set forth.

13. The combination, in a refrigerating apparatus, of the valve $l$, the seat $l'$, and a grating, $m^{11}$, inserted in the passage below said valve-seat, substantially as and for the purposes set forth.

14. The combination, in a refrigerating apparatus, of the valve $m$, provided with stem $m^3$, the seat $m'$, the threaded tube $m^4$, the spring $m^5$, surrounding said tube, and the adjusting-stem $m^6$, engaging with said threaded tube, substantially as and for the purposes set forth.

15. In a refrigerating apparatus, the combination of the valve $m$, provided with stem $m^3$, the seat $m'$, the spring $m^5$, the adjusting threaded tube $m^4$, the spring $m^5$ surrounding said tube, and the tube $m^{12}$, inclosing said spring and telescoping with tube $m^4$, substantially as and for the purposes set forth.

16. The combination, in a refrigerating apparatus, of the compressor-cylinder J, having the longitudinally-extended ports $j$ $j$ and the elongated piston K, whereby the suction and force valves are brought close together, and the space between said ports and valves is reduced to the minimum, substantially as and for the purposes set forth.

17. In a refrigerating apparatus, the compressor C, having a cylinder, J, and a piston therein composed of disks $k$ $k'$, sleeve $k^2$, divided expansible packing-rings $k^3$ $k^3$, breaking joints with each other, and continuous guide-rings $k^4$ $k^4$, arranged alternately with said packing-rings, substantially as and for the purposes set forth.

18. In a refrigerating apparatus, the compressor C, having a cylinder, J, an elongated piston, K, composed of the disks $k$ $k'$, the sleeve $k^2$, the divided expansible packing-rings $k^3$ $k^3$, breaking joints with each other, and wedges $k^5$, actuated by springs $k^6$, substantially as and for the purpose set forth.

19. The combination, in a refrigerating apparatus, of the compressor C, stuffing-box $c$, oil-chamber I', mounted thereon, communicating therewith, and permanently closed from without, and the pump I, connected with said chamber for forcing oil into the same, substantially as and for the purposes set forth.

20. The combination, in a refrigerating apparatus, of the compressor C, the stuffing-box $c$, the oil-chamber I', mounted thereon, communicating therewith, and permanently closed from without, an oil-reservoir, $d^6$, and a force-pump, I, connected with said reservoir $d^6$ and chamber I', substantially as and for the purposes set forth.

21. The combination, in a refrigerating apparatus, of the compressor C, the stuffing-box $c$, the sleeve $c^2$, having passages $c^3$ $c^4$, and the force-pump I, connected with said stuffing-box and communicating with the passages in said sleeve, substantially as and for the purposes set forth.

22. The combination, in a refrigerating apparatus, of the compressor C, the stuffing-box $c$, the chamber I', mounted thereon, communicating therewith, and permanently closed from without, and pipe I$^4$, connecting said chamber I' with the suction side of said compressor, substantially as and for the purposes set forth.

23. The combination, in a refrigerating apparatus, of the compressor C, the stuffing-box $c$, the chamber I', mounted thereon, communicating therewith, and permanently closed from without, gage I$^2$, applied to chamber I', pipe I$^4$, connecting said chamber with the suction side of the compressor, cock I$^3$, and pump I, for forcing oil into said chamber I', substantially as and for the purposes set forth.

24. In a refrigerating apparatus, the combination of the double-acting compressor C, the inlet $n$, the outlet $o$, the pipe $p$, connecting said inlet and outlet, and provided with a valve, $p^2$, substantially as and for the purposes set forth.

25. In a refrigerating apparatus, the combination of the compressor C, the inlet $n$, the outlet $o$, the passage $p$, connecting said inlet and outlet, and provided with the transparent tube $p^3$ and the valve $p^2$, substantially as and for the purposes set forth.

26. In a refrigerating apparatus, the combination of the compressor C, having branch connections $n\ o$, for the induction and eduction pipes, and the pressure-gages $n^4\ o^4$, applied to said branch connections, substantially as and for the purposes set forth.

27. The combination, in a refrigeration apparatus, of the cylinder J, the induction and eduction passages $n\ o$, the feed-valve O, automatic valve or valves $m$, and the vent $o^2$, located between said feed and automatic valves, substantially as and for the purposes set forth.

28. The combination, in a refrigerating apparatus, of the accumulator $y$, the detachable receiver $y'$, and the pipe-connections provided with cocks, substantially as and for the purposes set forth.

29. The combination, in a refrigerating apparatus, of the compressor, the condenser R, the pipe Q, leading from said compressor to the coils of the condenser, and the air-cock $G^{10}$, applied to the pipe Q, substantially as and for the purposes set forth.

30. The combination, in a refrigerating apparatus, of the condenser R and the chamber $S^2$, substantially as and for the purposes set forth.

31. The combination, in a refrigerating apparatus, of the receiver T and an auxiliary chamber, T', substantially as and for the purposes set forth.

32. The combination, in a refrigerating apparatus, of the condenser R, the receiver T, and the auxiliary chamber T', substantially as and for the purposes set forth.

33. The combination, in a refrigerating apparatus, of a coil, $u^2$, one or more settling-chambers, $S^3\ S^3$, applied thereto, and means for removing the impurities collected in said chambers, substantially as and for the purposes set forth.

34. The combination, in a refrigerating apparatus, of the distributing pipe $w$, the tanks W' $W^2$, &c., and the vessels X X, substantially as and for the purposes set forth.

35. The combination, in a refrigerating apparatus, of a tank or vat, W', and a portable water-vessel, X, substantially as and for the purposes set forth.

36. The combination, in a refrigerating apparatus, of the compressor and the hollow post or posts $v^4\ v^4$, connected therewith, substantially as and for the purposes set forth.

37. In a refrigerating apparatus, the combination of a cooling-coil with hinged supports, whereby the parts $u^3\ u^3$ of said coil are adapted to arched or curved ceilings, &c., substantially as and for the purposes set forth.

38. In a refrigerating apparatus, a cluster-column, $v^5$, the various parts $v^4\ v^4$ of which are hollow, in combination with the circulatory system of a cooling medium, substantially as and for the purposes set forth.

39. In a refrigerating apparatus, a building provided with hollow supporting posts or columns, combined with a circulating system, whereby a cooling agent is driven through said posts, substantially as and for the purposes set forth.

40. In a refrigerating apparatus, the cross $M^4$, having the chamber $M^6$, and the valve-seats $M^7$, and the ball-valve $M^5$, substantially as and for the purposes set forth.

41. In a refrigerating apparatus, the combination of the pipes $O^4\ O^4$, the thimble $O^5$, the glands $O^6\ O^6$, and the ball-valve $O^8$, substantially as and for the purposes set forth.

42. In a refrigerating apparatus, the combination of the pipe $H^{10}$ and the accumulator Y, the said pipe extending into the accumulator, substantially as and for the purposes set forth.

43. In a refrigerating apparatus, the combination of the receiver T, the tank $T^2$, containing said receiver T, and the pipe $I^{10}$, passing through said tank $T^2$, and communicating with any convenient part of the circulating pipes or chambers, substantially as and for the purposes set forth.

44. The combination, in a refrigerating apparatus, of the compressor A, the condenser R, the pipes Q and $R^4$, and the valves $R^5\ R^6$, substantially as and for the purposes set forth.

45. The combination, in a refrigerating apparatus, of the compressor A, the eduction-pipe Q, one or more settling-chambers, S S', applied to said pipe Q, and means for removing the impurities collected by said chambers, substantially as and for the purposes set forth.

46. In a refrigerating apparatus, the combination of the compressor A, the eduction-pipe Q, one or more settling-chambers, S S', in communication therewith, and a drainage pipe or pipes, $s\ s'$, leading from said chambers, substantially as and for the purposes set forth.

47. The combination, in a refrigerating apparatus, of the compressor, the receiver T, set in a cooling-tank, $T^2$, and communicating directly with said compressor, and the auxiliary receiver T', connected with said receiver T and with cooling pipes or coils, substantially as and for the purposes set forth.

THEODORE KRAUSCH.

Witnesses:
C. D. MOODY,
CHARLES PICKLES.